Aug. 29, 1961     R. E. RIDDLE     2,998,219
SUSPENSION ASSEMBLY
Filed Oct. 9, 1958
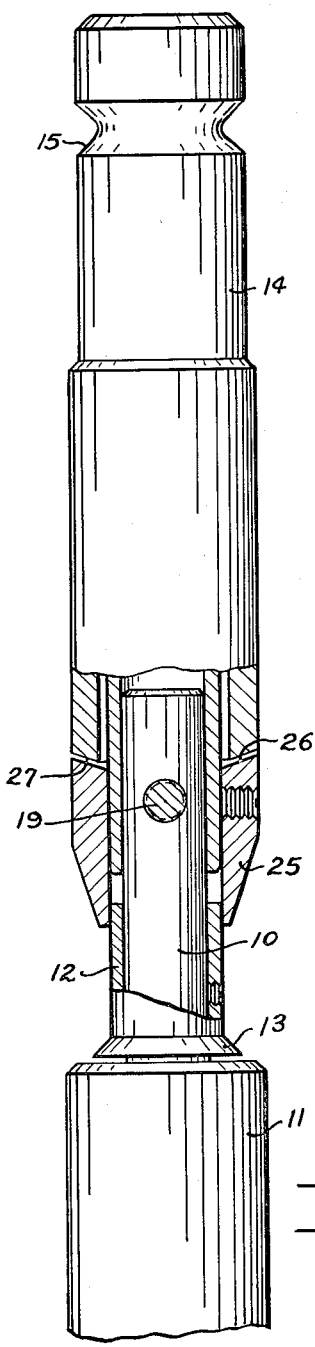
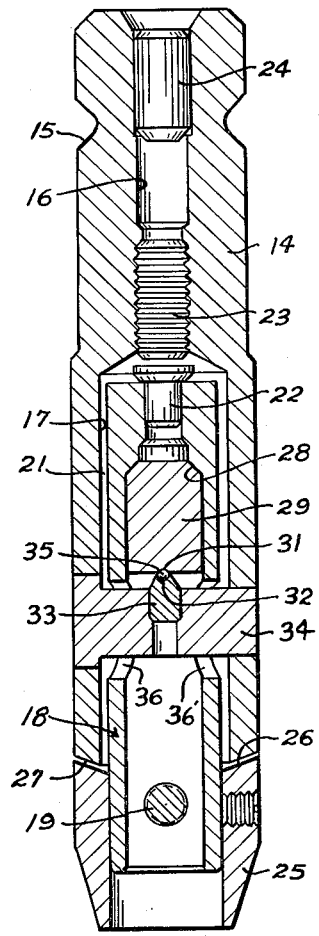
INVENTOR.
ROBERT E. RIDDLE
BY Tom Walker
ATTORNEY United States Patent Office 2,998,219
Patented Aug. 29, 1961

2,998,219
SUSPENSION ASSEMBLY
Robert E. Riddle, West Caldwell, N.J., assignor to Marvel Manufacturing Company, Caldwell, N.J., a partnership
Filed Oct. 9, 1958, Ser. No. 766,324
7 Claims. (Cl. 248—342)

This invention relates to suspension devices, and has particular although not limited reference to the suspension of balancers, for example balancers as disclosed in Patent No. 2,647,398 issued August 4, 1953 to Andrew Marvel.

Balancing devices of the kind described have a high degree of sensitivity and precision, so much so that there is a tendency to respond not only to very small unbalance forces in the object being balanced but also to very small angular forces transmitted to them from non-precision types of supporting structures such as hoist hooks, ropes, chains and cables. The inherent sensitivity and precision of such balancing devices can be better realized if response is limited to unbalanced forces in the object being balanced, and it is a basic intent of this invention to achieve this end.

The object of the invention is to simplify the construction as well as the means and mode of operation of suspension devices, whereby such devices may not only be economically manufactured, but will be more efficient and satisfactory in use, adaptable to a wide variety of applications, and be unlikely to get out of order.

A further object of the invention is to provide means for suspending a balancing device in a manner which isolates it from the uncontrolled effects of the external structural support so that the sensitive balance indications are in no way influenced by such external forces.

Another object of the invention is to present a suspension device to be interposed in a suspension type balancer insuring that the external supporting force is transmitted to the balancer in such a way that the resultant line of suspension coincides precisely with the center line of the balancer under all suspended conditions.

A further object of the invention is to insure that the balancer is completely free to align itself in a true vertical position, influenced by no forces other than the force of gravity, under all suspended conditions.

Still another object of the invention is to provide a suspension device as described having a unitary character and adapted to be interposed readily in new or existing suspension type balancers.

A further object of the invention is to provide a suspension device possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in side elevation, partly broken away, of a suspension device in accordance with the illustrated embodiment of the invention, a fragment of a static type balancer being shown in connection therewith; and FIG. 2 is a view in longitudinal section of the suspension device of FIG. 1.

Like parts are indicated by similar characters of reference throughout the several views.

Referring to the drawing, while the invention is adapted for use with a variety of suspension-type balancing and like devices it is here disclosed as interposed in a suspension balancer of the kind disclosed in the patent above identified. Such a balancer includes, as shown in FIG. 1, a suspension rod 10 longitudinally disposed within a tubular housing 11. The object to be balanced is supported upon the housing 11 to which the shaft 10 is secured at its lower end. In response to a condition of unbalance, the shaft 10 flexes at a point distant from its place of entry into the upper end of the housing 11. As a result of such flexure, the upper end or rim of the housing 11 takes up an eccentric position with respect to the shaft or rod 10 and more particularly with respect to a bushing 12 fixed thereon. The latter terminates at its lower end in a frusto-conical portion 13 overlying the upper end of the housing and operative in connection with the rim of the housing to provide a measurement of the degree of eccentricity.

A balancer as described is, in use, suspended from a suitable support such as cables, brackets, stands, etc. In the presence of the object to be balanced the balancer is in effect loaded in that it is subjected to a downward pulling force corresponding to the weight of the object. Removal of the object unloads the balancer or relieves it of such forces.

The instant invention contemplates the interposing between the balancer device proper and the support coupling means operative to avoid error which might be introduced into the balancer as a result of small angular forces transmitted through the hoist hooks, cables and the like by which the balancer is freely suspended. In accordance with the illustrative embodiment thereof, the coupler comprises a generally cylindrical body 14 which near one end thereof is formed with an annular groove 15 by which the coupler is suspended from the lower end of a cable or the like. Extending longitudinally through the body 14 is a bore 16. A counter-bore 17 opens through the lower end of the body 14 or that end opposite the annular groove 15 and terminates within the body. The suspension rod 10, the upper end of which extends through and beyond the bushing 12 is received in the lower end of a sleeve 18 which in turn is longitudinally disposed within the counter-bore 17. The rod 10 has a relatively close fit within the sleeve 18 and a long bearing therein precluding relative tilting motions therebetween. A crosspin 19 interconnects the rod and sleeve for unison rotary and longitudinal movements. The outside diameter of the sleeve 18 is somewhat less than the inside diameter of counter-bore 17, leaving therebetween an annular space 21 within the body providing for limited, lateral relative movement between the sleeve and body. In the upper or inner end of the sleeve 18 is installed an anvil 22 aligned with and spaced from the adjacent end of an elongated set screw 23 longitudinally disposed in the bore 16 and projecting into the bottom of counter-bore 17. Through the cooperation of the anvil 22 and set screw 23 longitudinal motion of the sleeve 18 into the counter-bore 17 positively is limited and without contact of the sleeve with the bottom of the bore. A removable plug 24 closes the upper end of the bore 16 to restrict access to the screw 23 and indiscriminate adjustment thereof. A cylindrical sleeve protector 25 is mounted on the lower end of the sleeve 18, inhibiting the entrance of dirt and other foreign matter. Complementary bevel or inclined surfaces 26 and 27 on the protector 25 and the lower end of body 14 define an area of small clearance inhibiting the entrance of foreign material into the lower end of the body, without, however, preventing a relative tilting motion as between the sleeve 18 and the body proper.

The upper end of the sleeve 18 is reduced in its inside diameter to receive the anvil 22 and to define a seat 28 for an insert element 29 in effect forming a part of the sleeve. The outer or lower end of the insert member 29 has in its center a shallow hemispherical socket 31. In opposed relation to the socket 31 is another hemispherical socket 32 formed in an insert element 33 set in a transverse support 34 forming a unitary part of the body 14. Thus, the support 34 has the character of a pin pressed into lateral openings in the body 14 in a manner transversely to intersect the counter-bore 17. The sleeve 18 has openings 36 and 36' intermediate its ends permitting the passage of the support 34 therethrough, and made oversize with respect to the diameter of the support to permit freedom of relative tilting motion of the sleeve, as well as relative longitudinal adjustment thereof. Interposed between and interfitting with the sockets 31 and 32 is a ball 35.

The weight of the sleeve 18, and parts suspended therefrom, accordingly is borne by the ball 35 and it will be understood that by reason of the centered, aligned relationship of the parts the sleeve normally will tend to balance upon the ball and to assume a concentric position within the counter-bore 17 in the manner shown in FIG. 2. In the event, however, of the application of unbalanced forces, the sleeve is free to pivot upon the ball 35. Thus, the sleeve 18 while being supported by the body 14 is actually freely movable relatively thereto, within the limitations of space 21, and so is free to remain aligned with suspension rod 10 should the body 14 be constrained to take up a non-centered position as a result of angular forces generating from the cable and overhead support. In this connection, the surfaces of the ball 35 and mating sockets 31 and 32 are precisely formed and possibly subject to damage in the event of side thrust. The instant construction, however, avoids such side thrusts as might be caused by extreme angular displacement between the suspension sleeve and body in that the parts contact one another at diametrically opposed points at the lower end of the body and at the upper end of the sleeve. This contact is made at the termination of a straight line passing through the ball center, consequently relieving the ball from side thrust forces as might be generated were contact made at one point only.

The setting of screw 23, which is an original factory adjustment, determines the amount of longitudinal movement permitted the sleeve 18 in the direction of the bottom of counterbore 17. It is important that the amount of permitted movement in this direction be low to avoid disengagement of the ball and socket connection. On the other hand, advantage is taken of this movement to obtain a continuous introduction of lubricant between the ball and socket surfaces when the balancer is unloaded. Accordingly, a precise adjustment of the screw 23 is arrived at having regard to the two factors described. The ball and socket surfaces, as well as the space immediately surrounding these parts is filled at assembly with a special non-flowing, non-hardening lubricant. Under load, the lubricant between the ball and mating spherical sockets forms a virtually frictionless load bearing film. When the balancer is unloaded, and the sleeve 18 relieved of the weight of the object being balanced a relaxation takes place at the ball and socket connection, a tendency limited by contact of the anvil 22 with the set screw 23. Relative displacement of the ball with respect to the sockets, under these circumstances, and within the controlled limits of the unloaded clearance, provides a suction or pumping action forcing enveloping lubricant into the clearance between the socket and ball. The ball and socket connection accordingly always is lubricated and prepared for the precise balancing of applied loads. The coupler device is readily adaptable to suspension balancers of varying sizes and capacities by sizing the ball and socket installations to provide lubricant film area appropriate to the load to be supported, and by varying other physical dimensions.

The overall diameter of the coupling device may be selected to be the same as, or smaller than, the diameter of the specific suspension balancer with which it is used. Consequently, the semi-permanent installation of the device on the suspension rod does not limit the freedom of use of various adapters and balancing assemblies on the basic balancer structure. Further, while the coupling device was primarily developed for use with suspension balancers of the kind here fragmentarily illustrated, its features may be readily adapted to other applications requiring the combination of a wide range of support capacity, very free angular self-adjustment and precise central alignment.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms, or modifications within the legitimate and valid scope of the appended claims.

Having thus described my invention, I claim:

1. A coupler for use in the suspension of self-aligning balancing and like devices, including a body having a portion to be engaged for suspension of said body, said body having a bore opening in aligned opposed relation to said portion, a suspension sleeve received in said bore with freedom of limited relative angular motion, a support in unitary relation to said body extending transversely through said bore and through said sleeve, said sleeve having an oversize opening accommodating said support, means providing a balanced mounting for said sleeve on said support permitting said sleeve freedom of relative tilting motion to seek a vertical disposition in space, and means in said bore limiting longitudinal motion of said sleeve in said body to preclude disengagement of said balanced mounting, said last named means being supported by said body.

2. A coupler for use in the suspension of self-aligning balancing and like devices, including a body having a portion to be engaged for suspension of said body, said body having a closed-end bore in aligned opposed relation to said portion and opening through the opposite end of said body, a sleeve received in said bore with one end thereof extending toward the closed end of said bore, the opposite end thereof being adapted for attachment to a suspension rod of a balancing device or the like, said sleeve having a diameter less than the internal diameter of said bore to provide for limited lateral motion thereof, said sleeve further having intermediate its ends a lateral through opening, a support in unitary relation to said body extending transversely through said bore and through said opening in said sleeve, a ball and socket connection between said support and said sleeve centering said sleeve in said bore and supporting said sleeve for limited tilting motion relatively to said body to seek vertical disposition in space, the lateral opening in said sleeve being oversize with respect to said support to permit such motion, and longitudinally adjustable means in said bore at its closed-end and adjustable to limit longitudinal motion of said sleeve in said body to preclude disengagement of said ball and socket connection in an unloaded condition of the coupler.

3. A coupler according to claim 2, characterized in that said last named means is set to limit the unloaded clearance in the ball and socket connection to a maximum preventing disengagement thereof in the unloaded condition, said ball and socket connection being enveloped in a lubricant moving into and out of said connection in response to the loading and unloading thereof.

4. A coupler for use in the suspension of self-aligning balancing and like devices, including a body having a portion to be engaged for suspension of said body, said body having a bore opening therethrough in opposed relation to said portion, a suspension sleeve received in said bore with freedom of lateral motion, said sleeve being adapted at its bottom or outer end for attachment to a suspension rod of a balancer or the like, said sleeve having intermediate its ends a lateral through opening, a support in unitary relation to said body extending transversely through said bore and through said lateral opening in said sleeve, said lateral opening being oversize to accommodate said support for freedom of relative tilting motion, opposed socket means in said support and said sleeve, a ball interposed between and received in said sockets, said ball and sockets being disposed to center said sleeve in said bore and to support said sleeve therein for a relative tilting motion, the sidewalls of said bore being concentric with respect to the outside diameter of said sleeve whereby contact between said sleeve and the sidewalls of said bore is made under extreme tilting conditions at the termination of a straight line passing through the ball center, consequently unloading the ball from side thrust forces.

5. A coupler according to claim 4, characterized by lubricant enveloping said ball and socket means, means adjustable in the bottom of said bore and engageable with the adjacent end of said sleeve to limit the unloaded clearance between said sockets and said ball in such manner as to achieve a pumping action on lubricant enveloping said ball and socket connection as said coupler is loaded and unloaded to force lubricant between said ball and socket means.

6. A coupler according to claim 4, characterized by a sleeve protector on the said bottom or outer end of said sleeve fastened externally thereof and adjustable thereon to achieve a minimum clearance with respect to said body to limit the access of foreign particles to the interior of the body within said bore and between the sidewalls thereof and said sleeve.

7. A coupler for balanced suspension of balancing apparatus including a body having means at one end for suspension thereof, a recess in the opposite end of said body extending toward said one end, a coupling means in the recess in said body, means providing a ball and socket suspension of said coupling means from said body establishing said coupling means in spaced relation to said body within said recess, a body of lubricant in said body about said ball and socket connection, loading of said coupling effecting a pressurized condition in said ball and socket suspension means and unloading inducing a temporary clearance and providing a pump action between the ball and socket to draw lubricant therebetween and means supported by said body limiting motion of said coupling means when unloaded to prevent disengagement of said suspension means.

References Cited in the file of this patent

UNITED STATES PATENTS

| | | |
|---|---|---|
| 1,729,947 | Lannen | Oct. 1, 1929 |
| 1,829,964 | Randall | Nov. 3, 1931 |
| 2,457,718 | Phelps | Dec. 28, 1948 |
| 2,698,537 | Taylor | Jan. 4, 1955 |